March 6, 1945.  S. R. BOGIN ET AL  2,370,931

COMBINED DRINK COOLER AND SIPPER

Filed March 9, 1944

INVENTORS
Samuel R. Bogin
John V. Delfino
BY
[signature]
ATTORNEY

Patented Mar. 6, 1945

2,370,931

UNITED STATES PATENT OFFICE 2,370,931

COMBINED DRINK COOLER AND SIPPER

Samuel R. Bogin and John V. Delfino,
Brooklyn, N. Y.

Application March 9, 1944, Serial No. 525,796

5 Claims. (Cl. 62—142)

This invention relates to new and useful improvements in a combined drink cooler and sipper.

More particularly, the invention proposes an article as mentioned which is characterized by a closed container for refrigerant material, said container to have a removable cap for filling purposes and being adapted to be placed in the beverage to be cooled. It is proposed to arrange a sipper tube along the side wall of the container so that the cooled drink may be sipped.

The invention contemplates constructing said closed container of various designs, as for example, in the design of a fish, flower, bottle, or other object.

Furthermore, the invention proposes constructing the sipper tube and the container integral.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
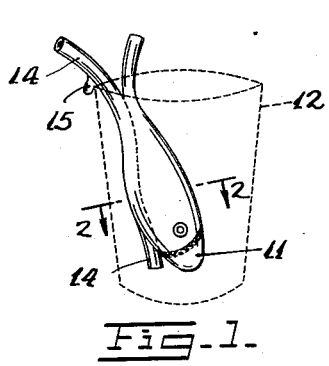
Fig. 1 is an illustration of a combined drink cooler and sipper constructed in accordance with one form of this invention.
Figure 2:
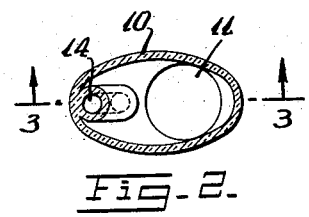
Fig. 2 is an enlarged horizontal sectional view taken on the line 2—2 of Fig. 1.
Figure 3:
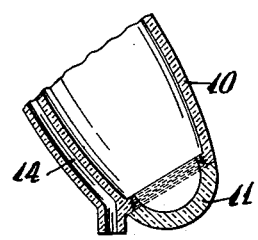
Fig. 3 is a fragmentary vertical sectional view taken on the line 3—3 of Fig. 2.

The combined drink cooler and sipper, in accordance with that form of the invention disclosed in Figs. 1-3, includes a closed container 10 for refrigerant. This container is provided with a removable cap 11 for filling purposes. The container 10 is of a design so that it may be placed within a drink to be cooled. In Fig. 1 the dot and dash lines 12 schematically illustrate a glass holding a drink and illustrate the new drink cooler and sipper engaged into the glass.

A sipper-like tube 14 extends along the side wall of the container 10. The top end of the tube 14 projects above the container 10 so that it may be easily engaged between one's lips. The bottom end of the tube 14 terminates a small distance above the bottom of the container.

The container 10 and the sipper tube 14 are made integral. Preferably, the container and sipper tube are constructed of glass, plastic material or other desirable materials. A hook-like projection 15 upon the sipper tube 14 is adapted to engage the rim of the glass 12 for supporting the sipper upon the glass.

The container 10 may be constructed of any desired shape to simulate any desired object. In the form disclosed, it simulates a fish. It may be provided with suitable surface ornamentation.

Figure 4:
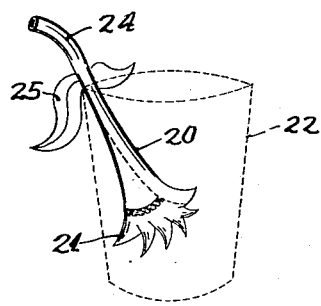
Fig. 4 is an illustration of a combined drink cooler and sipper embodying another form of this invention.

In Fig. 4 another embodiment of the invention has been disclosed which distinguishes from the prior form merely in design. In this form of the invention the combined drink cooler and sipper includes a container 20 for refrigerant material and provided with a removable cap 21 for filling purposes. The container 20 is adapted to be engaged in a drink to be cooled, such as within a glass, schematically illustrated by the dot and dash lines 22. A sipper tube 24 extends along the side wall of the container 20. The container 20 is of a floral design. It is provided with several leaves 25 which may act as hooks for supporting the drink cooler and sipper on the edge of the glass 22. In other respects this form of the invention is similar to that previously shown and like reference numerals identify like parts in each of the several views.

Figure 6:
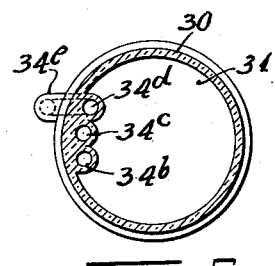
Fig. 6 is an enlarged horizontal sectional view taken on the line 6—6 of Fig. 5.
Figure 5:
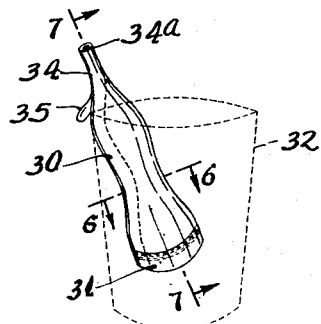
Fig. 5 is another illustration of a combined drink cooler and sipper constructed according to another modified form of this invention.
Figure 7:
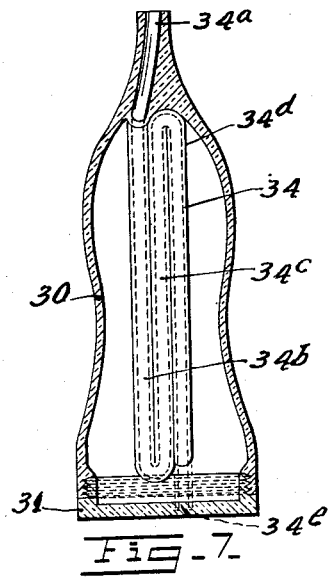
Fig. 7 is a vertical sectional view of the drink cooler, also taken on the line 7—7 of Fig. 5.

In Figs. 5-7 still another embodiment of the invention has been disclosed which is very similar to the prior form, distinguishing essentially in the construction of the sipper tube 34. More specifically, the drink cooler and sipper includes a closed container 30 in the shape of standard soda bottle design. This container 30 is adapted to hold refrigerant material. It is provided with a removable cap 31 for filling purposes. In Fig. 5 it is shown engaged into and supported on a glass 32 by a projecting hook 35.

A sipper tube 34 extends along the side wall of the container 30. This sipper tube 34 has several coils so as to increase its length. Essentially, the sipper tube 34 has a top inlet portion 34ª which connects with a portion 34ᵇ extending down the wall of the container 30, which continues into a portion 34ᶜ extending up to near the top of the container 30, and then continues into a downwardly extending portion 34ᵈ which terminates in a bottom end 34ᵉ externally of and at the bottom of the container 30. Since the sipper tube 34 is capable of holding a relatively larger quantity of the liquid being cooled, said drink is more effectively cooled.

In each of the forms of the invention disclosed the sipper tubes extend internally along the side walls of the containers.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A combined drink cooler and sipper, comprising a closed container for refrigerant and having a removable cap for filling purposes, and adapted to be placed in a drink to be cooled, and a sipper tube extending along the side wall of said container.

2. A combined drink cooler and sipper, comprising a closed container for refrigerant and having a removable cap for filling purposes, and adapted to be placed in a drink to be cooled, and a sipper tube extending along the side wall of said container, said sipper tube being integral with the material of said closed container.

3. A combined drink cooler and sipper, comprising a closed container for refrigerant and having a removable cap for filling purposes, and adapted to be placed in a drink to be cooled, and a sipper tube extending along the side wall of said container, and extending inside of the container.

4. A combined drink cooler and sipper, comprising a closed container for refrigerant and having a removable cap for filling purposes, and adapted to be placed in a drink to be cooled, and a sipper tube extending along the side wall of said container, and extending inside of the container, and having its ends outside of said container.

5. A combined drink cooler and sipper, comprising a closed container for refrigerant and having a removable cap for filling purposes, and adapted to be placed in a drink to be cooled, and a sipper tube extending along the side wall of said container, and having several coils within said container.

SAMUEL R. BOGIN.
JOHN V. DELFINO.